May 19, 1964
A. N. IKNAYAN
3,133,585
TIRE REPAIR PATCH
Filed Nov. 5, 1962
2 Sheets-Sheet 1
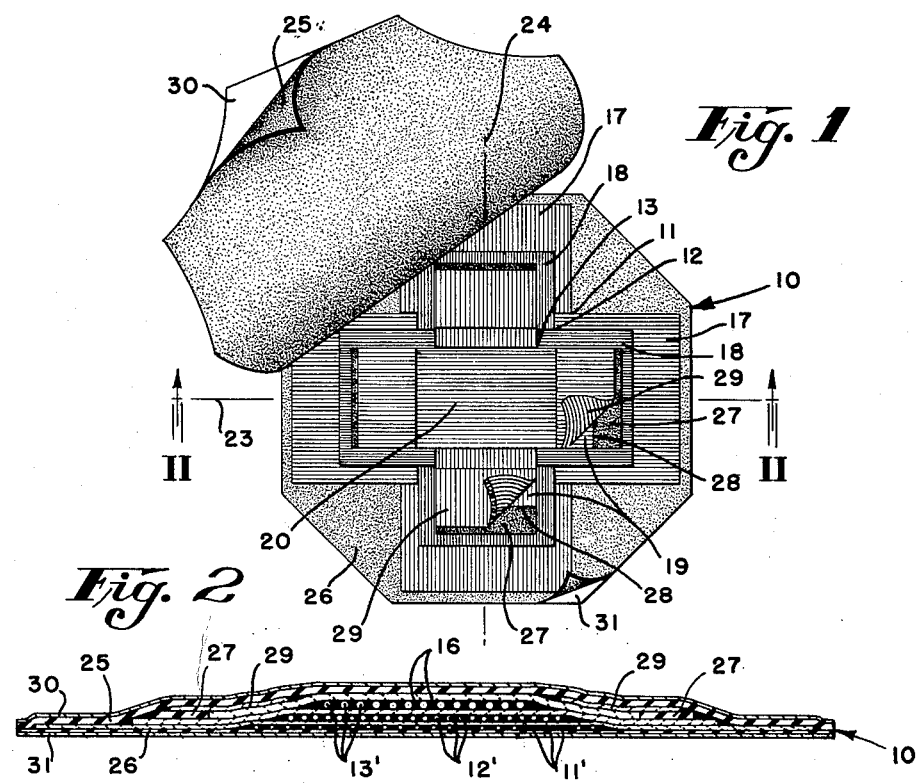
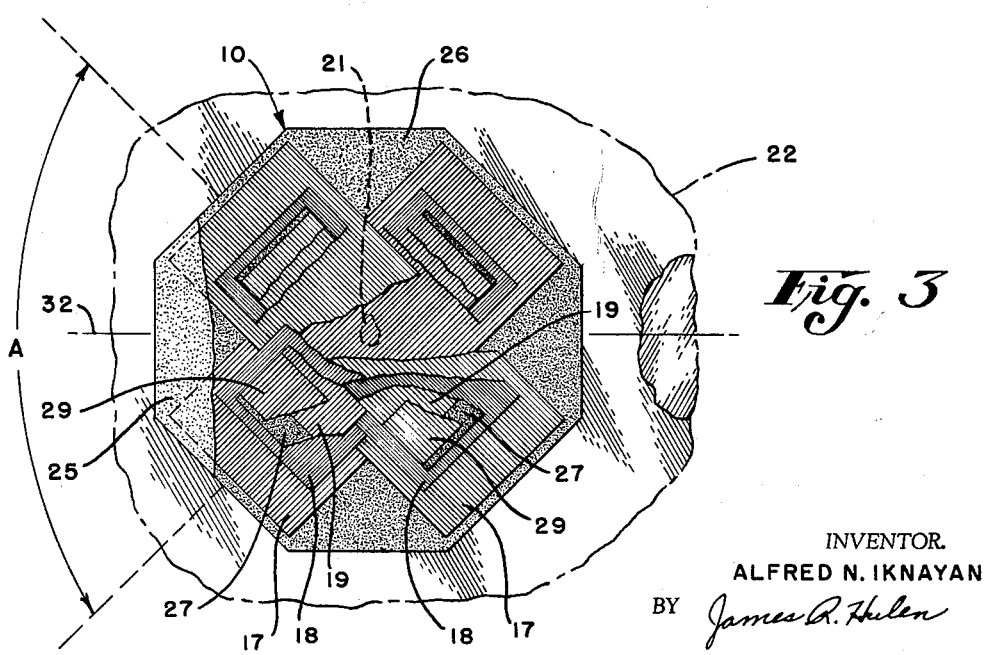
INVENTOR.
ALFRED N. IKNAYAN
BY James R. Hulen May 19, 1964  A. N. IKNAYAN  3,133,585
TIRE REPAIR PATCH
Filed Nov. 5, 1962  2 Sheets-Sheet 2

INVENTOR.
ALFRED N. IKNAYAN
BY James R. Hulen

United States Patent Office 3,133,585
Patented May 19, 1964

3,133,585
TIRE REPAIR PATCH
Alfred N. Iknayan, Indianapolis, Ind., assignor to United States Rubber Company, New York, N.Y., a corporation of New Jersey
Filed Nov. 5, 1962, Ser. No. 235,569
11 Claims. (Cl. 152—367)

This invention relates to an improved tire repair patch employing rubberized fabric containing tensile strands for reinforcing the tire carcass at an injured area. The invention relates particularly to the utilization of spaced rubberized tensile strands of different degrees of flexibility and strength for increasing the life and strength of tire repair patches.

In conventional practice, the elements of the patch are bonded together with rubber and the patch when in use is bonded with rubber to the inside of the carcass over the injured area. The flexing of the patch with the tire carcass by the movement of the tire over the road, heretofore has caused the rubber bond between the ends of the tensile strands or cords of the patch and the adjacent elements to break and permit the ends to separate from such elements. After the separation has begun, the continued flexing of the patch causes the separation to grow until the patch loses its reinforcing value and the repaired carcass fails.

It is the general object of this invention to increase the reinforcing strength and life of the tire patch.

A more specific object of this invention is to prevent tire patch failure resulting from the separation of the tensile strand ends.

Another and more specific object of this invention is to prevent the separation of the tensile strands by placing an abutting strip of rubber at the ends of the less flexible reinforcing bands or strips of the patch containing the tensile strands, and extending a textile layer of fabric over the adjoining surfaces of the ends of the strands and the abutting strip of rubber, and bonding the fabric to the strands and to the abutting strip of rubber.

A further object of this invention is to increase the strength and the life of the tire patch by building into the patch reinforcing members having graduated flexibility and strength and placing the more flexible and weaker reinforcing member nearer the carcass than the less flexible and stronger reinforcing members which are placed more distant from the carcass.

With the above and other objects of this invention in view, the invention is further described in reference to the accompanying drawings, in which:

FIG. 1 is a plan view of a tire repair patch embodying this invention, portions of which are peeled back to show parts of the patch which otherwise would be hidden from view;

FIG. 2 is an enlarged sectional view of the tire patch shown in FIG. 1, and taken on line II—II of FIG. 1;

FIG. 3 is a plan view of the inside of a tire carcass, showing the repair patch bonded thereto with parts broken away to illustrate the relationship between parts of the patch and the cords in the plies of the carcass.

Figure 5:
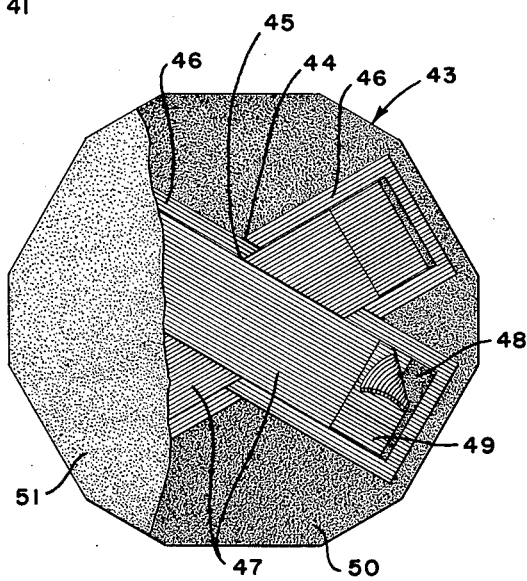
Figure 6:
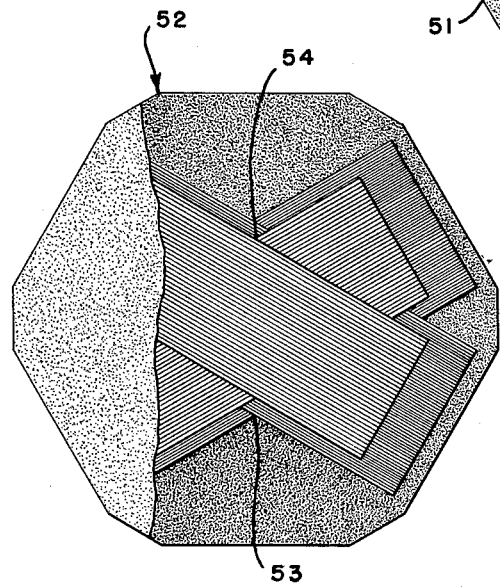

FIG. 5 is a plan view of another modification similar to the patch shown in FIG. 1, excepting for the less number of reinforcing members, and the major angle between the strips of each member being about 120°; and FIG. 6 is a plan view of still another modification similar to FIG. 5, excepting the strands in the top reinforcing member are more flexible, and the rubber strips and cover fabric at the ends of the strand are omitted.

A tire repair patch 10 embodying this invention is shown in the drawings which is representative of a patch particularly useful in heavy duty tires. Referring to FIGS. 1 and 2, the patch 10 comprises a plurality of superimposed rubberized fabric reinforcing members 11, 12 and 13. Each of the reinforcing members 11, 12 and 13 are formed of two crossed rubberized bands or weftless strips of fabric containing load carrying warp tensile strands 11', 12' and 13', respectively, as shown in FIG. 2. Such strands are bonded together with rubber 16 filling the spaces between the strands of each strip, and may be made of suitable nylon cord, or the like.

For heavy duty patches, it is preferred to use wire tire cord in the top reinforcing member 13 to obtain greater strength.

The bottom reinforcing member 11 is formed of relatively wide and long strips 17. The intermediate reinforcing member 12 is formed of narrower and shorter strips 18, and the top reinforcing member 13 is formed of still narrower and shorter strips 19. The area where the strips cross each other forms the central area 20 of the patch, which is placed over the injured area 21 of the carcass 22, as shown in FIG. 3. The center lines 23 and 24 of the sets of strips extending in different directions lie over each other in substantially the same plane. The strips of each reinforcing member extend an equal distance beyond the area where they cross each other, and since the strips of each member are narrower and shorter than the strips of the adjacent member below, a stepped up construction from the edge of the patch to the central area 20 is built into the patch. The stepped up construction provides a change in small steps from greater flexibility at the outer edge of the patch to less flexibility and greater strength at the central area 20. This change of flexibility in small steps is an aid in preventing cord end separation resulting from abrupt changes in flexibility, which increase the flexure stresses at the cord ends. The reinforcing members 11, 12 and 13 are enclosed between a top cover layer 25 of rubber and a bottom bonding layer 26 of rubber, which latter is adapted to be bonded to the inside of the carcass 22.

The flexure of the tire patch produces shearing strains in the rubber between the superimposed strips of the reinforcing members and between the patch and the tire carcass. Such shearing strains are greatest in the rubber nearest the inner surface of the carcass and they decrease as the distance between the reinforcing members and the carcass increases. Heretofore, such shearing strains, particularly the strains in the rubber nearest the carcass, have caused the bond between the rubber and the strands to break down, with the result that the ends of the strands breakloose and the patch becomes delaminated. It has been found that the breakdown of the rubber and the delamination is reduced or eliminated, and at the same time a patch of great strength is produced by making the strips of the reinforcing members of different degrees of flexibility and strength in the lengthwise direction per unit of width and arranging the member containing the strips of greatest flexibility and the accompanying least strength so that it is nearest the carcass, and arranging the other members so that they are superimposed on the bottom member one above the other in the order of their increase in strength and decrease in flexibility as qualified above. In such construction, the intensity of the shear stresses and strains in the patch is reduced, particularly at the ends of the cords, and a stronger patch is produced.

Following the foregoing principle, the strips 17 of the bottom reinforcing member 11 are sufficiently flexible in their lengthwise direction per unit of width to withstand the greatest flexure which occurs at the carcass, the strips 18 of the member 12 are less flexible and stronger than the strips 17, and in turn the strips 19 of the member 13 is less flexible and stronger than the strips 18 in the lengthwise direction per unit of width in each case. The foregoing flexibility and strength may be controlled by (1) using a cord of the same size and kind and increasing the number of cords per unit width of the strips of each member in the order in which the members are placed one above the other, or by (2) using less flexible and stronger cords of a selected number per unit width of strip.

For example, in case (1) a tire repair patch may be made with all nylon 840 denier 2 ply tire cord with 14 ends per inch (E.P.I.) in the strips of the bottom reinforcing member 21, E.P.I. in the intermediate member 12, and 30 E.P.I. in the strips of the top member 13.

The use in case (2) above of stronger and less flexible cords in the several reinforcing members is illustrated in FIG. 2, where the larger cords indicate greater strength and less flexibility. As an example in this case, for heavy duty patches, 21 E.P.I. of 840 denier, 2 ply nylon cords are incorporated in the strips 17 of the bottom reinforcing members 11, 21 E.P.I. of 1680 denier, 2 ply nylon cords are incorporated in the strips 18 of the intermediate reinforcing member 12, and 7.5 E.P.I. of wire tire cords are incorporated in the strips 19 of tie top member 13. A suitable construction of such wire cord is 5 x 7 x .0059 having a carbon content of from 0.63% to 0.90% and a tensile strength of from 350,000 to 400,000 p.s.i. The wire cords increase the strength of the patch and reduces the disintegration resulting from build-up of heat in the patch.

It is desirable to use cords of high strength in the rubberized strips to obtain greater tensile strength per unit of width of strip and at the same time provide the necessary space between the cords for the required quantity of rubber 16 to produce a strong bond between the rubber and the cords of the same strip, as well as between the adjacent strips. For that purpose, the percent of space between the cords should be not less than 40%.

The failure of the tire patch 10 resulting from the cord ends of the less flexible reinforcing members breaking loose from the rubber bond is further reduced or eliminated, as shown in FIG. 1, by placing a strip of vulcanizable rubber 27 along the line 28 of the cord ends of the less flexible strips 19 of the top member 13, and then applying a textile strip 29 of fabric over the ends of the cords 19 and over the line 28 of the ends onto the rubber strip 27, which should fill the space at the ends of the strips 13. The rubber strips 27 when vulcanized provide a cushioned abutment into which the ends of the cords 13' are extended when they are flexed from their normal position towards the center of the torus of the tire. For that purpose the rubber is compounded with conventional ingredients to produce a hardness of about 50 Shore A durometer. The rubber strips 27 and the textile strip 29 resiliently hold down the ends of the cords 13', while the textile strip also reduces the sharpness of the bending movement of the patch at the ends of the cords and thereby prevents the rubber bond along the line 28 of the ends from breaking down and causing cord end separation. The use of short strips 29 at each end of strips 19 rather than a single strip extending all the way along the strips 19 and over its ends, reduces the quantity of material in the patch and injurious heat build-up.

All of the rubber material is vulcanizable but unvulcanized when built into the patch. The parts of the patch are adhered together by the natural tackiness of the unvulcanized rubber materials. The rubber stock for the cover layer 25, the cushion layer 26, and the rubber 16 in the weftless cord strips is compounded with conventional ingredients. However, it is useful to add a good bonding agent, such as diaryl guanidine-formaldehyde reaction product 6 parts and resorcinol 1.25 parts per 100 parts of rubber hydrocarbon, as set forth in U.S. Patent No. 2,927,051.

Conventional protective backing material layers 30 and 31 are applied to the outer faces of the rubber layer 25 and 26 and remains on such surfaces until the patch is put into the carcass.

Preferably, the tire repair patch 10 is applied to the inside surface of the tire carcass 22 in the unvulcanized state as described above. The protective layers 30 and 31 are peeled from the patch before it is applied. The bonding layer of rubber 26 is placed adjacent to the inner surface of the carcass 22, and the central area 20 is placed over the injured area 21 of the carcass. The patch 10 is arranged on the carcass 22 so that the angle A between the strips in the reinforcing members is bisected by the rotational plane of the tire as represented by the line 32 in FIG. 3. The tire repair patch is vulcanized in such position in the carcass and bonded thereto during the vulcanization by the cushion layer of rubber 26. All of the components of the patches are thus strongly bonded together and to the carcass.

However, the patch assembled as above without the bonding layer 26 may be prevulcanized before being applied to the carcass. In that case the unvulcanized bonding layer 26 is assembled on the bottom of the patch and the patch is then vulcanized to the carcass with the use of a vulcanizable rubber cement.

Figure 4:
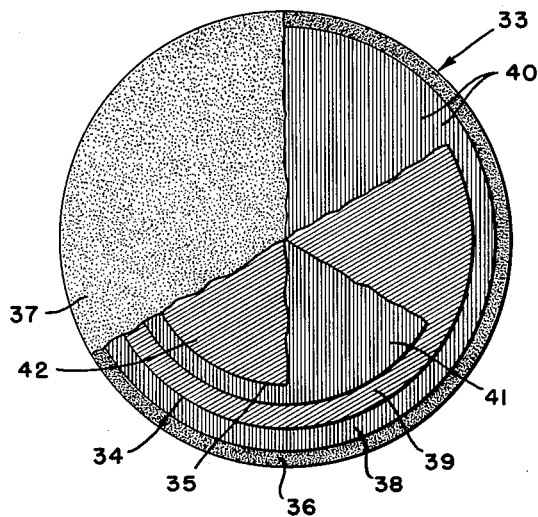
FIG. 4 is a plan view of a modified form of a tire repair patch embodying this invention which is circular in shape.

Other tire patches embodying this invention are shown in FIGS. 4, 5 and 6 of the drawings.

The tire patch 33 shown in FIG. 4 has a round shape and is provided with two reinforcing members 34 and 35 incased between a bottom bonding layer of rubber 36 and a top cover layer of rubber 37. The bottom reinforcing member 34 comprises two discs 38 and 39 of rubberized weftless tire cord fabric similar to fabric used in the bottom reinforcing member of FIG. 1. The cords 40 in the individual discs are arranged at an angle to each other, the major angle being about 120°. The top reinforcing member 35 comprises two discs 41 and 42 similar to the discs 38 and 39, excepting more cords per inch or larger cords are contained therein to render the member stronger with the result that such member is less flexible than the bottom member 34. The cords in the discs 41 and 42 are arranged parallel to the cords in the discs 38 and 39, respectively.

The tire patch 43 shown in FIG. 5 is made of rubberized tire cord strips similar to the patch shown in FIG. 1 excepting the cords in the reinforcing members 44 and 45 are two in number, and the major angle of the strips 46 and 47 in the members is about 120°. As an example, the member 44 may contain 2 ply nylon cords of 1680 denier in the order of 21 E.P.I., and the member 45 may contain wire tire cord of the kind stated in the example given in reference to FIG. 1, but in the order of 15 E.P.I. The ends of the wire cords are provided with abutting strips of rubber 48 and the cover strip of rubberized textile fabric 49. The reinforcing members are incased between a bottom bonding and a cover layer 50 and 51 of rubber, respectively.

The tire patch 52 shown in FIG. 6 is similar to the patch shown in FIG. 5, excepting the cords in the bottom reinforcing member 53 are 2 ply nylon, 840 denier, 21 E.P.I. and the cords in the top reinforcing member 54 are 2 ply nylon, 1680 denier, 14 E.P.I. Also, the end abutting strip of rubber and end cover strip of fabric are omitted.

Whereas, the preferred forms of the tire repair patch embodying this invention have been described and disclosed herein, it will be understood that the number of reinforcing members, the type of tensile strands, and the E.P.I. may be changed, and other changes may be made in the patch without departing from the spirit of the invention and the scope of the claims appended hereto.

Having thus described my invention, what I claim and desire to protect by Letters Patent is:

1. A tire repair patch comprising a plurality of reinforcing members superimposed one above the other on a bottom reinforcing member, each said reinforcing member comprising rubberized tensile strands which cross each other at the center of the patch, and said strands of the bottom reinforcing member being spaced more distant from each other than the strands of the members superimposed thereon, whereby said bottom reinforcing member is more flexible than said superimposed members.

2. A tire repair patch comprising a plurality of reinforcing members, superimposed one above the other on a bottom reinforcing member adapted to be placed nearest the tire carcass, each of said reinforcing members comprising two crossed strips of rubberized weftless fabric, the corresponding strips of each member extending in the same direction one above the other, said strips of each said member having different degrees of lengthwise flexibility and tensile strength per unit width, said strips of said bottom reinforcing member having the greatest such flexibility and least such strength, said strips of each said member being less flexible and stronger in the lengthwise direction per unit of width than said strips of the adjacent said member below, and all of said members and components thereof being adhered together.

3. A tire repair patch comprising a plurality of reinforcing members superimposed over a bottom reinforcing member adapted to be placed nearest the tire carcass, each of said reinforcing members comprising two crossed strips of rubberized fabric containing longitudinally extending tensile strands forming a central area of the member where they cross, said strips of each said member extending beyond said central area on each side thereof, the strips of said bottom reinforcing member being the widest, longest and most flexible of the strips in said tire patch, said strips of each said member being narrower, and shorter, than said strips of the adjacent said member below, and all of said members and components thereof being adhered together with rubber.

4. A tire repair patch comprising a plurality of reinforcing members superimposed over a bottom reinforcing member adapted to be placed nearest the tire carcass, each of said reinforcing members comprising two crossed strips of rubberized fabric containing longitudinally extending tensile strands forming a central area of the member where they cross, said strips of each said member extending beyond said central area on each side thereof, the strips of said bottom reinforcing member being the widest and longest of the strips in said tire patch and also having the greatest flexibility and the least tensile strength longitudinally per unit of width, said strips of each said member being narrower, shorter, less flexible and stronger in the lengthwise direction per unit of width than said strips of the adjacent said member below, and all of said members being adhered together with rubber.

5. A tire repair patch comprising a plurality of rubberized fabric reinforcing members superimposed one above the other and sandwiched between a top layer of rubber and a bottom layer of rubber adapted to be adhered to the inside of the carcass of a tire, said reinforcing members and rubber layers being adhered together, each of said reinforcing members containing two sets of rubberized tensile strands crossing each other and forming where they cross the central area of said patch which is adapted to be placed over the injured area of the tire carcass, said tensile strands extend beyond each side of of said central area, the center line of the different sets of crossed strands of each member lie over the center lines of the sets of crossed strands of the other members, the bottom reinforcing member having sufficient flexibility to withstand the flexure stresses under road conditions, and each of said members above said bottom reinforcing member having less flexibility at the ends of its said tensile strands and greater tensile strength per unit width across said strands than such flexibility and strength in the adjacent member below.

6. A tire repair patch comprising a plurality of reinforcing members superimposed one above the other on a bottom reinforcing member adapted to be placed nearest the tire carcass, each of said reinforcing members comprising two crossed strips of weftless fabric, which extend an equal distance beyond the area where they cross, the center lines of the corresponding strips of each member extend in the same direction one above the other, said strips of each member being narrower and shorter less flexible and stronger in the lengthwise direction per unit of width than said strips of the adjacent member below, a strip of rubber extending along and abutting against the ends the strips of the top said reinforcing member, a strip of rubberized fabric placed over the ends of the strips of the said top member and onto said abutting strip of rubber, a top and a bottom layer of rubber enclosing all of the other components of said patch, and all of said components of said patch being adhered together.

7. A tire repair patch comprising a plurality of reinforcing members superimposed one above the other on a bottom reinforcing member adapted to be placed nearest the tire carcass, each of said reinforcing members comprising two crossed strips of weftless fabric, and extending an equal distance beyond the area where they cross, the center line of each crossed strip of each member lying over the center line of a crossed strip of the other members, said strips of the top reinforcing member having wire warps, said strips of each member being less flexible and stronger in the lengthwise direction per unit of width than said strips of the adjacent member below, a strip of rubber extending along and abutting against the ends the strips of the top said reinforcing member, a strip of rubberized fabric placed over the ends of the strips of the said top member and onto said abutting strip of rubber, a top and a bottom layer of rubber enclosing all of the other components of said patch, and all of said components of said patch being adhered together.

8. A tire repair patch comprising a plurality of rubberized fabric reinforcing members superimposed one above the other and sandwiched between a top layer of rubber and a bottom layer of rubber adapted to adhere to the inside of the carcass of a tire, said reinforcing members and rubber layers being adhered together, each of said reinforcing members containing two sets of rubberized tensile strands crossing each other and forming where they cross the central area of said patch which is adapted to be placed over the injured area of the tire carcass, said tensile strands extending beyond each side of said central area, the center line of each set of crossed strands of said members lie in the same plane, the bottom reinforcing member containing textile fiber tensile strands of sufficient flexibility to withstand the flexure stresses under road conditions, the top member containing steel wire tensile strands, each of said members having less flexibility at the ends of its said tensile strands and greater tensile strength per unit width across said strands than such flexibility and strength in the adjacent member below, a strip of rubber extending along and abutting against the ends the strips of the top said reinforcing member, a strip of rubberized fabric placed over the ends of the strips of the said top member and onto said abutting strip of rubber, a top and a bottom layer of rubber enclosing all of the other components of said patch, and all of said components of said patch being adhered together.

9. A tire repair patch comprising a plurality of reinforcing members superimposed one above the other on a bottom reinforcing member adapted to be placed nearest the tire carcass, each of said reinforcing members comprising two crossed strips of weftless fabric which extend an equal distance beyond the area where they cross, each strip crosses the other at the same angle, the center line of each crossed strip of each member lying over the center line of a crossed strip of the other members, said strips of the top reinforcing member having stranded wire warps, said strips of each member being narrower and shorter, less flexible and stronger in the lengthwise direction per unit of width than said strips of the adjacent member below, a strip of rubber extending along and abutting against the ends of the strips of the top said reinforcing member, a strip of rubberized fabric placed over the ends of the strips of the said top member and onto said abutting strip of rubber, a top and a bottom layer of rubber enclosing all of the other components of said patch, and all of said components of said patch being adhered together.

10. A tire patch comprising a plurality of disc-like reinforcing members, each member comprising two discs of rubberized weftless cord fabric, the cords in said discs of the same member being arranged at an angle to each other, said angle being the same in all said members and the cords of the bottom disc of each member extend in the same direction, said discs of said members being progressively smaller than the other from the bottom to the top, and each member being less flexible than the member below it.

11. A tire repair patch comprising a plurality of rubberized fabric reinforcing members superimposed over a bottom rubberized fabric reinforcing member adapted to be placed nearest to the tire carcass, said bottom reinforcing member having the greatest flexibility, said other members being less flexible than said bottom member, and all of said members being adhered together.

References Cited in the file of this patent

UNITED STATES PATENTS

| | | |
|---|---|---|
| 1,968,606 | Knapton | July 31, 1934 |
| 2,852,058 | Chambers et al. | Sept. 16, 1958 |
| 3,004,580 | Chambers et al. | Oct. 17, 1961 |

FOREIGN PATENTS

| | | |
|---|---|---|
| 455,883 | Canada | Apr. 12, 1949 |